(No Model.)

G. H. MACKAY.
SHAFT COUPLING.

No. 382,765. Patented May 15, 1888.

WITNESSES
A. D. Grover
J. T. Ball

INVENTOR
Geo. H. Mackay,
by Wight Brown & Crossley,
attys.

UNITED STATES PATENT OFFICE.

GEORGE H. MACKAY, OF SALEM, NEW HAMPSHIRE, ASSIGNOR OF ONE-HALF TO ORLANDO WOODBURY, OF SAME PLACE.

SHAFT-COUPLING.

SPECIFICATION forming part of Letters Patent No. 382,765, dated May 15, 1888.

Application filed June 17, 1887. Serial No. 241,632. (No model.)

*To all whom it may concern:*

Be it known that I, GEORGE H. MACKAY, of Salem, in the county of Rockingham and State of New Hampshire, have invented certain new and useful Improvements in Shaft-Couplings, of which the following is a specification.

It is the object of my invention to provide a shaft-coupling which shall be at once efficient for the purposes for which it is intended, be economic of construction, and be easily and quickly applied.

It is also the object of my invention to adapt my invention to serve as a hose-patch or hose-coupling.

To these ends my invention consists in the improvements which I will now proceed to describe and claim, reference being had to the accompanying drawings and to the letters of reference marked thereon, forming a part of this specification, the same letters indicating the same parts wherever they occur.

Figure 1:
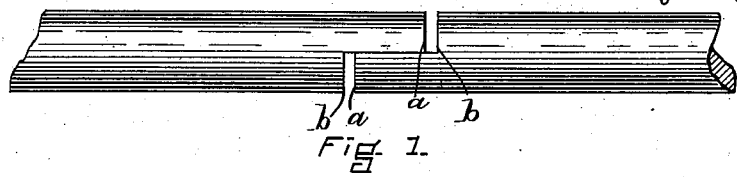
Figure 2:
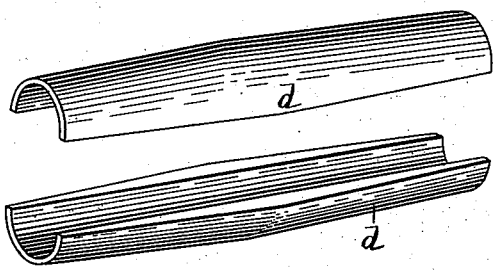
Figure 3:
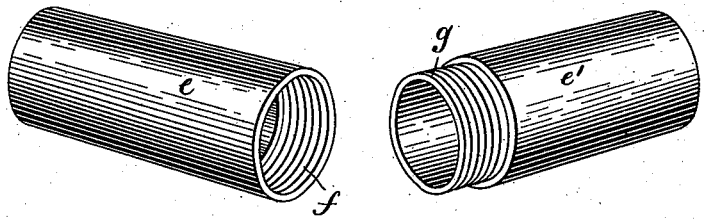
Figure 4:
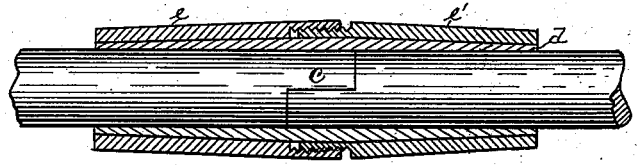

Of the drawings, Figure 1 represents the manner of forming or shaping the ends of two shafts which it is designed to couple or connect. Fig. 2 is a perspective view of the clamping-shells adapted to be placed over the shafts at their meeting ends. Fig. 3 is a perspective view of the two clamping-thimbles adapted to be slipped over and screwed upon the clamping-shells. Fig. 4 is a longitudinal sectional view of my invention employed as a shaft-coupling.

In carrying out my invention as a shaft-coupling I cut away a portion of each of the shafts to be connected or coupled from its meeting end $a$ backwardly to, for example, a point, $b$, the amount cut away being, at the point mentioned, substantially one-half of the shaft, so that when the two ends are brought together they will "match," as represented at $c$ in Fig. 4. Two clamping-shells, $d\ d$, provided on their inner surfaces with rounded grooves formed to fit over the shaft, are then constructed, said clamping-shells being of slightly tapering form exteriorly from their centers toward their ends, as represented in Figs. 2 and 4.

$e\ e'$ represent clamping-thimbles adapted to be slipped over the shaft and the clamping-shells $d\ d$ thereon and connected, so as to hold the shells on the shaft and connect or couple the meeting ends of the same, as represented in Fig. 4.

As a means for connecting the meeting ends of the thimbles $e\ e'$, I have shown the former as provided with a female screw, $f'$, and the latter with a male screw, $g$, so that each part $e\ e'$ may first be slipped over the shaft and back from its meeting ends, and, after the clamping-shells $d\ d$ have been placed in position, brought forward or together over said clamping-shells and screwed together, the interior bore of the thimbles being also, by preference, made slightly tapering, so as to fit over the shells and clamp the same closely and effectively upon the shaft.

It is obvious that in coupling a shaft the meeting ends may be fashioned or formed in a manner other than that shown and described. They may, for instance, be beveled instead of offset.

Other changes may be made in the form and arrangement of the parts constituting my invention without departing from the nature or spirit thereof.

Having thus described my invention, what I claim is—

The combination, with a divided shaft having abutting ends, each of such abutting ends being offset or cut away, as at $a\ b$, the construction and arrangement being such that the two ends will match or register when brought together, of the clamping-shells $d\ d$, adapted to be placed over the shaft at the meeting ends, and the clamping-thimbles $e\ e'$, the latter provided with a male screw and the former with a female screw, substantially as and for the purposes set forth.

In testimony whereof I have signed my name to this specification, in the presence of two subscribing witnesses, this 7th day of June, A. D. 1887.

GEORGE H. MACKAY.

Witnesses:
ARTHUR W. CROSSLEY,
C. F. BROWN.